Sept. 4, 1956 M. R. MAUGE 2,761,904

SIGNALLING SYSTEMS USED FOR CHARACTERIZING
SUBSCRIBER'S LINES IN A TELEPHONE NETWORK

Filed Nov. 8, 1951 2 Sheets-Sheet 1

Inventor
M. R. MAUGE
By
Robert Harding Jr.
Attorney

SIGNALLING SYSTEMS USED FOR CHARACTERIZING SUBSCRIBER'S LINES IN A TELEPHONE NETWORK

Filed Nov. 8, 1951 2 Sheets-Sheet 2

Inventor
M. R. MAUGE
By Robert Harding Jr.
Attorney

United States Patent Office 2,761,904

Patented Sept. 4, 1956

2,761,904

SIGNALLING SYSTEMS USED FOR CHARACTERIZING SUBSCRIBER'S LINES IN A TELEPHONE NETWORK

Marcel Roger Mauge, Boulogne-Billancourt, France, assignor to International Standard Electric Corporation, New York, N. Y., a corporation of Delaware Application November 8, 1951, Serial No. 255,348

Claims priority, application France November 9, 1950

8 Claims. (Cl. 179—18)

Figure 1:
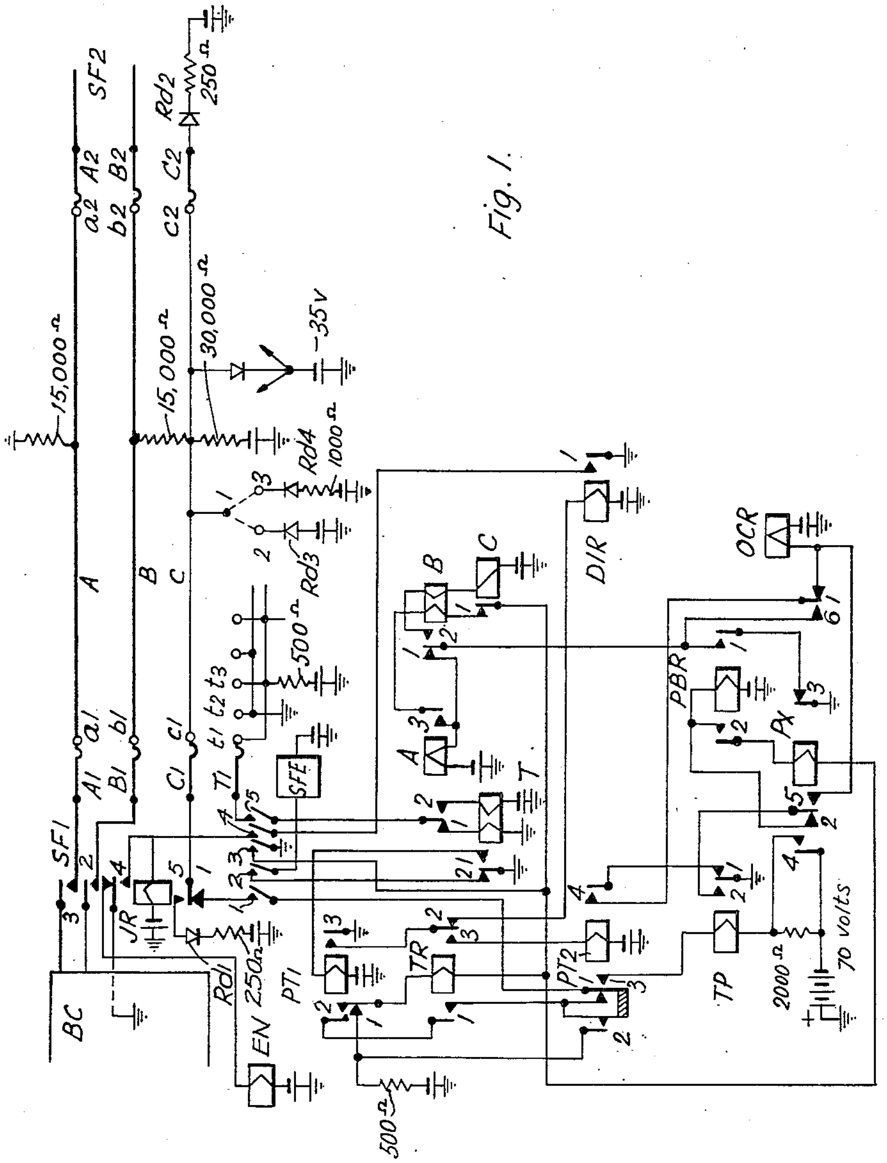

The present invention concerns improvements in signalling systems used for characterizing subscribers' lines in a telephone network and more especially in systems used for characterizing the lines allotted to a given subscriber or to a given service.

In known automatic telephone systems in which the line circuits only comprise three wires, usually described as wires A, B and C, wires A and B are connected to the wires of the subscriber's line and wire C is used for signalling purposes. Wire C is generally connected to the negative terminal of a 48 volt battery, on the one hand through the winding of a relay, called "cut-off relay," and on the other hand through the winding of the electromagnet of the call meter, the resistance of the two windings connected in parallel, being for example, near 800 ohms. In such systems the first and last lines of a group of lines allotted to a given subscriber are, for instance, characterized by a 700 ohm resistance connected between wire C and the negative terminal of the 48 volt battery. Under such conditions, the total resistance connected between wire C and the negative terminal of the 48 volt battery is near 375 ohms. Means adapted for measuring the resistance connected between wire C and the negative terminal of the 48 volt battery and for seizing a position between two possible positions, according to whether the value of this resistance is near 700 ohms or near 375 ohms, permits discrimination between the first and last lines allotted to a given subscriber or to a given service of ordinary lines. Certain line circuits, called static line circuits, possess neither line relays nor cut-off relays and comprise resistances permanently connected for example between wire A and ground, between wire B and wire C and between wire C and the last negative terminal of a 48 volt battery. When such circuits are used, the calling lines are characterized by potential variations of wire C, the resistances carrying a current, when the line wires are looped. The busying of the line, whether it is calling or called, is produced by connecting to wire C the negative terminal of a 48 volt vattery through a 250 ohm resistance. To avoid a large decrease of the current on the subscriber's line, high resistances with respect to the impedance of the line and the subscriber's position are utilized. In an embodiment of the invention, resistances connected between wire A and ground, between wire B and wire C, and between wire C and the negative terminal of a 48 volt battery are respectively of the following values: 15,000 ohms, 15,000 ohms and 30,000 ohms. It is then impossible to characterize the first and last lines of a group allotted to a given subscriber by connecting between wire C and the negative terminal of a 48 volt battery a resistance below 1,000 ohms, for instance 700 ohms, because the resistance connected between wire C and the negative terminal of the 48 volt battery would be near 700 ohms and the potential variations of wire C in case of a call would be insufficient to cause the starting.

One of the objects of the invention is, in such automatic telephone systems, to characterize differently the first and the last line of a group of lines allotted to a given subscriber or a given service.

Another object of the invention is to provide simple means for hunting for a free line among a group of lines allotted to a given subscriber.

According to one of the features of the invention in an automatic telephone system in which the line circuit comprises only three wires, e. g.: two conversational wires, called wire A and wire B, and a signalling wire, called wire C, and in which there exist neither line relays nor cut-off relays, the calls are detected from the potential variations on wire C, a device for characterizing the busy lines being provided which comprises in combination: a resistance of a low value in relation to the value of the resistance normally connected between wire C and a terminal of the battery of the central exchange, a rectifying cell, switching means adapted for connecting the said resistance and rectifying cell in series between wire C and the said terminal of the battery when the line is engaged, the direction in which this said rectifying cell is connected being such that the current passes through the said resistance when wire C is connected to the other terminal of the said battery.

According to another feature of the invention, in such systems the first line of a group of lines allotted to a given subscriber is characterized by a rectifying cell connected between the first terminal of the battery and wire C, the direction in which the said rectifying cell is connected being such that no current passes through said rectifying cell when wire C is connected to the other terminal of the said battery.

According to another feature of the invention, in such systems the last line of a group of lines allotted to a given subscriber is characterized by a rectifying cell connected in series with a resistance between the first terminal of the battery and wire C, the said rectifying cell being connected in the same direction as in the case of the first line of a group of lines allotted to a given subscriber.

According to another feature of the invention, in such automatic telephone systems, a system is provided for hunting for a free line among a group of lines allotted to a given subscriber and comprises in combination: means adapted to carry out the test of the line reached from the standpoint of its availability, switching means adapted for connecting in series a resistance of the order of the resistance used for characterizing the last line of a group and the winding of a relay between the said wire C and a terminal having a potential such that a current can flow in the winding of the said relay when wire C belongs to the first line of a group of lines allotted to the same subscriber, the said relay being designed in order to operate when it is connected in series with a single resistance, such as that used for characterizing the last line of a group, and not to operate when it is connected in series with two resistances, the said testing means being adapted for controlling the said switching means when the line reached is busy, means adapted to cause the stepping of the final selector by one step and to make the test of the following line, and controlled by the operation of the said relay which is also provided in order to control the operation of the switching means to short circuit the said resistance connected in series with the winding of the said relay, the hunting being thus stopped when the final selector meets the last line of the group.

According to another feature of the invention a source of current having a potential difference on its terminals higher than the difference of potential on the terminals of the battery of the central exchange comprises in combination: means adapted for charging a condenser from the battery of the central exchange associated with means adapted for connecting the charged condenser and the battery of the central exchange in series.

Figure 2:
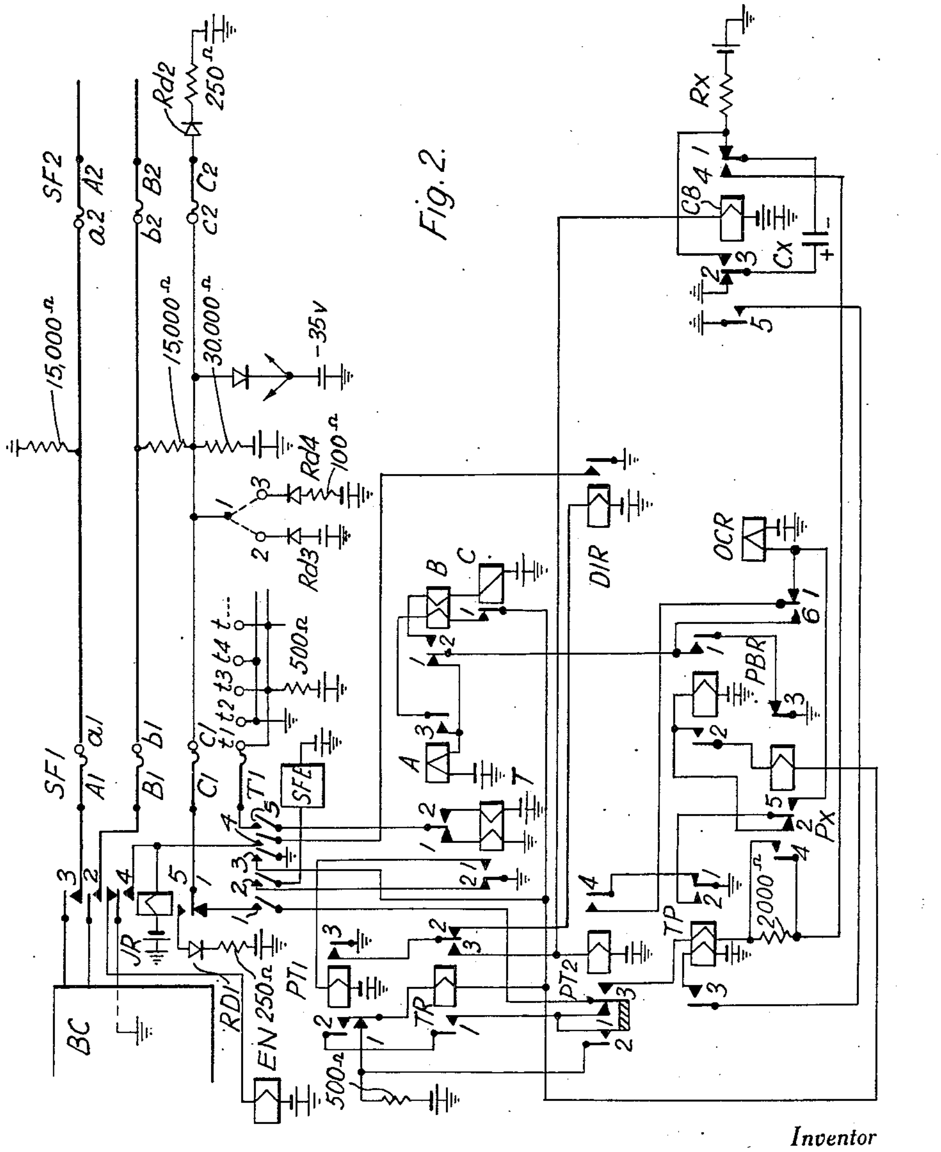

Other objects, features and advantages of the present invention will appear from a reading of the following description of an embodiment of the present invention, the said description being given in connection with the accompanying drawings in which:

Figure 1 represents the circuit used for controlling the hunting of a free line among a group of lines allotted to a given subscriber; and Figure 2 represents an alternative of the device represented on Fig. 1.

On Fig. 1 it has been assumed that brushes A1, B1, C1 and T1 of final selector SF1 are in contact with terminals *a*1, *b*1, *c*1, *t*1 of the called line and that relay EN is operated in a circuit from battery, winding of relay EN, break contact 4 of relay JR to ground in the central exchange BC. Clutching electromagnet SFE of final selector SF1 is energized in a circuit from battery, make contact 2 of relay EN, break contact 2 of relay T, ground. Relay TR has operated through the following circuit: battery, 500 ohm resistance, break contact 1 of relay PT1, winding of relay TR, make contact 3 of relay EN, ground. When brush T1 brushes T1 comes into contact with terminal *t*1, relay T operates by means of the following circuit: battery, 500 ohm resistance, terminal *t*1, brush *t*1 of selector SF1, make contact 5 of relay EN, break contact 1 of relay A, left hand winding of relay T, ground. By the action of its break contact 2 relay T opens the energizing circuit of the clutching electro-magnet SFE of final selector SF1, thus stopping this selector's movement. Relay PT1 operates through the following circuit: battery, winding of relay PT1, make contact 1 of relay T, ground. If the line reached is an ordinary line, a wire C of this line is connected to the negative terminal of a 48 volt battery, by means of a 30,000 ohm resistance. If the line is free, the winding of relay TR is connected to the battery, after the operation of relay PT1, through the following circuit: ground, make contact 3 of relay EN, winding of relay TR, make contact 2 of relay PT1, make contact 1 of relay TR, break contact 1 of relay PT2, make contact 1 of relay EN, break contact 1 of relay JR, brush C1 and terminal *c*1 of final selector SF1, 30,000 ohm resistance, negative terminal of the 48 volt battery; under these conditions, the current passing through the winding of relay TR is not sufficient to maintain this relay which falls back. Relay DIR operates then by means of the following circuit: battery winding of relay DIR, break contact 2 of relay TR, make contact 3 of relay PT1, and ground. Relay DIR, which shows that the line is free, closes a circuit for relay JR over its make contact 1 and make contact 4 of relay EN. The operation of relay JR, by its make contacts 2 and 3, extends wires A and B of the reached line within the central exchange represented by schematic block BC. Relay JR locks itself by its make contact 4, and by its make contact 5 it connects wire C of the line to the negative terminal of a 48 volt battery through a rectifying cell R*d*1 and 250 ohm resistance, so as to busy the line reached.

Now let us assume that the line reached is already engaged by another final selector, such as SF2, the negative terminal of a 48 volt battery being connected to wire C of the line reached through the following circuit: battery, 250 ohm resistance, rectifying cell R*d*2, brush C2 and terminal *c*2, wire C. When the final selector SF1 reaches the line, the following circuit is established: ground, make contact 3 of relay EN, winding of relay TR, make contact 2 of relay PT1, make contact 1 of relay TR, break contact 1 of relay PT2, make contact 1 of relay EN, break contact 1 of relay JR, brush C1 and terminal *c*1 of selector SF1, wire C, terminal *c*2 and brush C2 of selector SF2, rectifying cell R*d*2, 250 ohm resistance, negative terminal of a 48 volt battery.

Under these conditions, the resistance of the elements connected between wire C and the negative terminal being around 250 ohms, relay TR continues to operate. Relay DIR does not operate but relay PT2 operates through the following circuit: battery, winding of relay PT2, make contact 3 of relay TR, make contact 3 of relay PT1 and ground. By its make contact 2 relay PT2 closes the holding circuit of relay TR: ground, make contact 3 of relay EN, winding of relay TR, make contact 2 of relay PT1, make contact 1 of relay TR, make contact 2 of relay PT2, 500 ohm resistance, negative terminal of a 48 volt battery. By its make contact 3, relay PT2 closes the following circuit: negative terminal of a 70 volt battery, 2,000 ohm resistance, winding of relay TP, make contact 3 of relay PT2, make contact 1 of relay EN, break contact 1 of relay JR, brush C1, terminal *c*1 of final selector SF1, wire C of the called line. If the line reached is an ordinary line and is engaged as it has been previously assumed, wire C of this line is connected, as it has been stated above, to the negative terminal of a 48 volt battery through a 250 ohm resistance and a rectifying cell such as R*d*2. The direction of the rectifying cell R*d*2, as shown on Figure 1, is such that no current passes through the winding of relay TP. Under these conditions, relay OCR, the operation of which shows that the line is engaged, operates through the following circuit: battery, winding of relay OCR, break contact 1 of relay PX, make contact 4 of relay PT2, break contact 1 of relay TP and ground. Relay OCR causes, as it is well known, the sending of the busy tone to the calling subscriber.

If the line is a first line P. B. X, wire C is connected to the negative terminal of a 48 volt battery through a rectifying cell such as R*d*3, that is, on Figure 1, terminals 1 and 2 are electrically connected. Under these conditions, when relay PT2, by its make contact 3, connects the winding of relay TP to wire C of the line reached, relay TP operates, rectifying cell R*d*3 being connected in relation to wire C in an opposite direction to rectifying cell R*d*2. Relay PBR operates then through the following circuit: battery, winding of relay PBR, break contact 2 of relay PX, make contact 2 of relay TP and ground. By its make contact 1, relay PBR closes the circuit of relay A: battery, winding of relay A, break contact 1 of relay B, make contact 1 of relay PBR, break contact 3 of relay PX, ground. By opening of its break contact 1, relay A causes the falling back of relay T whcih, by its break contact 2, closes the energization circuit of the clutching electromagnet SFE. Relay PT1 falls back, its energization circuit being opened by make contact 1 of relay T. Relay PT2 falls back, its energization circuit being opened by make contact 3 of relay PT1. Relay TR remains operated, its holding circuit being closed by break contact 1 of relay PT1. By opening of its make contact 3, relay PT2 causes the falling back of relay TP which, by opening of its make contact 2, unshort-circuits relay PX which operates then in series with relay PBR to ground over make contact 3 of relay EN. Relay B, which up till then was short-circuited, operates in series with relay A. By closing of its make contact 4 relay PX short-circuits the 2,000 ohm resistance connected between the negative terminal of the 70 volt battery and the winding of relay TP. When brush T1 has reached terminal *t*2, relay T operates through the following circuit: battery, right-hand winding of relay T, make contact 2 of relay A, make contact 5 of relay EN, brush T1 and terminal *t*2 of selector SF1, and ground. Relay PT1 operates, as it has already been explained, and the test of the line reached is carried out by means of a method identical to that already described. The line reached can be either an intermediary line or the last line of a group of lines allotted to a given subscriber. If the line reached is free, the test operations lead to the operation of relay DIR. If the line reached is not free, relay TR, is maintained and relay PT2 operates through the following circuit: battery, winding of relay PT2, make contact 3 of relay TR, make contact 3 of relay PT1, ground. If the line reached is an intermediary line, relay TP does not operate. Relay C operates then in series with relay B through the following circuit: battery, winding of relay C, right hand winding of relay B, make contact 2 of relay B, make contact 6 of relay PX, make contact 4 of relay PT2, break contact 1 of relay TP and ground. By opening of its break contact 1 relay C opens the holding circuit of relay A which falls back. By opening of its make contact 2 relay A opens the operating circuit of relay T which falls back and closes by its break contact 2 the operating circuit of the clutching electro-magnet SFE of final selector SF1 which controls then the stepping of the selector the brush T of which comes into contact with terminal *t*3. The operating circuit of relay PT1 is opened by contact 1 of relay T. The test operations are then pursued until the final selector comes into contact with the last line of the group of lines allotted to the called subscriber, whether it is free or not.

In the present description we have assumed that the line corresponding to terminal *t*2 of the final selector was an intermediary line of a group of lines allotted the called subscriber. Now let us suppose that this line is the last of the group. In these conditions, wire C of the line reached is connected to the negative terminal of a 48 volt battery through a 1,000 ohm resistance and a rectifying cell R*d*4, since, on Fig. 1, terminal 3 is connected to terminal 1. If the line is free, the test operations lead to the operation of relay DIR as was previously explained. If the line is engaged, relay TR is maintained operated and relay PT2 operates. The following circuit is then established: negative terminal of the 70 volt battery, make contact 4 of relay PX, winding of relay TP, make contact 3 of relay PT2, make contact 1 of relay EN, break contact 1 of relay JR, brush C1 and terminal *c*1 of final selector SF1, wire C of the calling line, terminals 1 and 3, rectifying cell R*d*4, 1,000 ohm resistance, negative terminal of a 48 volt battery. As may be seen on Fig. 1, the direction the rectifying cell R*d*4 is connected is such that a current passes through the winding of relay TP which operates. Relay OCR indicating that the line is busy operates through the following circuit: battery, winding of relay OCR, make contact 5 of relay PX, make contact 2 of relay TP and ground. The hunting stops then and the final indication that the called subscriber is engaged is transmitted to the calling subscriber by well known means.

When a calling subscriber calls a subscriber who is connected to several lines, he usually sends, by means of his dial, the number of the first line of the group and in case this line is engaged, the test of the other lines is carried out automatically until the final selector reaches a free line in the group or the last line of the group, whether this one is free or engaged. Nevertheless it may happen that either through an error, or intentionally, the calling subscriber dials the number of the last line of the group to which the called subscriber is connected. In certain automatic telephone systems in which the first and the last line of the group are characterized by identical names, when one calls the last line of a group and it is engaged, the test devices may control the hunting for the next free lines as if the line reached was the first line of a group. Under these conditions the final selector stops on the first free line which it meets though it does not belong to the given group.

If in the automatic switching system shown on Fig. 1 the called line is the last of a group of lines allotted to the same subscriber, wire C of the reached line is connected to the negative terminal of a 48 volt battery through a rectifying cell such as R*d*4 and a resistance of 1,000 ohms. Under these conditions, if the line is engaged, relay TR remains operated after the operating of relay PT1 and relay PT2 operates. The following circuit is then established: negative terminal of a 70 volt battery, 2,000 ohm resistance, winding of relay TP, make contact 3 of relay PT2, make contact 1 of relay EN, break contact 1 of relay JR, brush C1 and terminal *c*1 of final selector SF1, terminals 1 and 3, rectifying cell R*d*4, 1,000 ohm resistance, negative terminal of a 48 volt battery. Relay TP is established so as to operate when a 2,000 ohm resistance is connected in series with its winding between the negative terminal of a 48 volt battery and the negative terminal of the 70 volt battery and not to operate when a 2,000 ohm resistance and a 1,000 ohm resistance are connected in series with its winding. Thus relay TP does not operate when the final selector reaches directly the last line of a group of lines allotted to a given subscriber. Relay OCR characteristic of the called line being engaged operates then through the following circuit: battery, winding of relay OCR, break contact 1 of relay PX, make contact 4 of relay PT2, break contact 1 of relay TP and ground. The characteristic busying signal of the called line is then sent to the calling subscriber.

Figure 2 represents an alternative of the device represented on Fig. 1 in which the 70 volt battery is replaced by a charged condenser which is connected in series with the battery of the central exchange. The operation of the circuit is identical and it is only necessary to explain in detail the switching operations which lead to the charging of the condenser and its connection in series with the battery of the central exchange when the test of the first or the last line of a group of lines allotted to a given subscriber. Let us assume that the line reached by the final selector is engaged and that it is the first line of a group. Relay CB being at rest during the test operations of the reached line, condenser CX is charged through the following circuit: battery resistance R*x*, break contact 1 of relay CB, condenser CX, break contact 2 of relay CB and ground. After the test of the line reached which is supposed to be engaged, relay PT1 operates and relay TR is maintained; relays PT2 and CB operate in parallel. By its make contacts 3 and 4 relay CB connects the charged condenser CX in series with the battery of the central exchange and the winding of relay TP. As it has been assumed that the line reached was the first of a group, relay TP operates and locks itself by its make contact 3. The test operations which are pursued are identical to those described in the case of Fig. 1. The use of a 70 volt battery which is not normally used in an automatic telephone central exchange is thus avoided.

While the principles of the invention have been described above in connection with specific embodiments and particular modifications thereof, it is to be clearly understood that this description is made only by way of example and not as a limitation on the scope of the invention.

What is claimed:

1. In a telephone system having a plurality of lines arranged in groups, each line having a test wire, and selective apparatus for selectively engaging a group of lines and hunting for a free line in the selected group, the combination comprising individual electrical source means connected to the test wire of each line of a group, the means connected to the first and last lines having electrical characteristics different from each other and from those of the other lines, means in said selective apparatus normally responsive only to the electrical characteristics of a first line, means for directly connecting said responsive means to the test wire of a line for a test of said line as soon as said selective apparatus has selected said line, means operated by said responsive means for causing said selective means to hunt over the lines of a group when said responsive means operates during said test, means also operated by the operation of said responsive means for changing the responsiveness of said responsive means so as to make it responsive to the electrical characteristic on the test wire of a last line, and means controlled by the operation of said last mentioned means and said responsive means for stopping the hunting of said selective apparatus upon a subsequent operation of said responsive means.

2. In a telephone system, the combination, as defined in claim 1, further comprising additional electrical source means selectively connectable to each test wire for indicating the busy condition thereof, and in which the connecting means in the selective apparatus comprises means for testing the test wire of a seized line to determine whether it is free or busy.

3. In a telephone system, the combination, as defined in claim 2, in which the responsive means comprises a relay and a resistor in series therewith and the means for changing the responsiveness of the responsive means comprises a second relay having a contact for short circuiting said resistor.

4. In a telephone system, the combination, as defined in claim 1, in which the responsive means comprises a relay and a resistor in series therewith and the means for changing the responsiveness of the responsive means comprises a second relay having a contact for short circuiting said resistor.

5. In a telephone system, having a plurality of lines some of which are arranged in groups, each line having a test wire, and selective apparatus for selectively engaging said lines, the combination comprising means for testing a seized line over its test wire to determine whether it is free or busy, and means under control of said last mentioned means for testing the line over said same test wire to determine the class of line, said means comprising a relay, a resistor, means for connecting said relay and resistor in series with the test wire of a seized line, and means controlled by the first operation of said test relay for short circuiting said resistor, whereby the resistance in the circuit of said relay is reduced for testing subsequent lines.

6. In a telephone system, having a plurality of lines, some of which are arranged in groups, and selective apparatus for selectively engaging said lines, the combination which comprises a first source of potential having one terminal grounded, means for normally applying a predetermined potential from said source to each of said lines, means in said selective apparatus responsive to said predetermined potential for controlling the completion of the connection, means responsive to the seizure of a line for normally connecting said responding means to a line when said apparatus seizes said line, means for changing the potential of a line when said line is busy, so that said responsive means will not respond thereto, a rectifier for each first and last line of a group, means for connecting the rectifier associated with the first line of each group directly between said source and said line, a resistor for the last line of each group, means for connecting the resistor associated with the last line of each group in series with the rectifier associated therewith between said source and said line, said rectifiers being so poled that they will not effect the operation of said responding means, a relay, a second source of potential greater in value than said first source and having one terminal grounded, a second resistor connected between the other terminal of said second source and said relay, means controlled by said line seizure responsive means for operating said connecting means to disconnect said responsive means from said line and connect said relay to said line, and means responsive to the first operation of said relay for short circuiting said associated resistor, whereby the resistance of the circuit of said relay is reduced and said relay can operate thereafter only in circuit with the rectifier and resistance of the next succeeding last line.

7. In a telephone system, the combination, as defined in claim 3, in which the electrical source means connected to the test wires of the lines comprises a source of potential and separate circuit means connecting said source to said test wires, said connecting circuit means of the first and last lines including resistors arranged so that the resistances between the test wires of the first and last lines and said source are different from each other and from those between the test wires of the other lines and said source, and in which rectifiers are included in the circuit means connecting said source with said test wires, said rectifiers being poled so that current is normally prevented from flowing therethrough, said system further comprising a second source of potential connected to the relay of the responsive means, said source having such polarity and value that current can flow through said rectifiers.

8. In a telephone system, the combination, as defined in claim 4, in which the electrical source means connected to the test wires of the lines comprises a source of potential and separate circuit means connecting said source to said test wires, said connecting circuit means of the first and last lines including resistors arranged so that the resistances between the test wires of the first and last lines and said source are different from each other and from those between the test wires of the other lines and said source, and in which rectifiers are included in the circuit means connecting said source with said test wires, said rectifiers being poled so that current is normally prevented from flowing therethrough, said system further comprising a second source of potential connected to the relay of the responsive means, said source having such polarity and value that current can flow through said rectifiers.

References Cited in the file of this patent

UNITED STATES PATENTS

| | | |
|---|---|---|
| 2,152,889 | Jedrychowski | Apr. 4, 1939 |
| 2,295,032 | Deakin | Sept. 8, 1942 |
| 2,502,415 | Bray et al. | Apr. 4, 1950 |
| 2,576,097 | Bray et al. | Nov. 27, 1951 |
| 2,583,014 | Pouliart | Jan. 22, 1952 |
| 2,593,418 | Den Hertog | Apr. 22, 1952 |
| 2,598,822 | Oberman | June 3, 1952 |
| 2,709,203 | Buchner | May 24, 1955 |

FOREIGN PATENTS

| | | |
|---|---|---|
| 907,195 | France | Mar. 5, 1946 |